(12) United States Patent
Moore et al.

(10) Patent No.: US 7,351,777 B2
(45) Date of Patent: Apr. 1, 2008

(54) RETARDED ANIONIC POLYMERIZATION OF VINYL AROMATIC MONOMERS USING INSOLUBLE OR HETEROGENEOUS RETARDANTS

(76) Inventors: Eugene R. Moore, 5600 Woodview Pass, Midland, MI (US) 48642; Duane B. Priddy, Sr., 6004 Camalot Ct., Midland, MI (US) 48642

( * ) Notice: Subject to any disclaimer, the term of this patent is extended or adjusted under 35 U.S.C. 154(b) by 107 days.

(21) Appl. No.: 11/392,218

(22) Filed: Mar. 29, 2006

(65) Prior Publication Data

US 2006/0223957 A1 Oct. 5, 2006

Related U.S. Application Data

(60) Provisional application No. 60/666,365, filed on Mar. 30, 2005.

(51) Int. Cl.
*C08F 2/40* (2006.01)
*C08F 12/08* (2006.01)

(52) U.S. Cl. .......... 526/82; 526/65; 526/173; 526/177; 526/183; 526/185; 525/53

(58) Field of Classification Search .......... 526/82, 526/65, 173, 177, 183, 185; 525/53
See application file for complete search history.

(56) References Cited

U.S. PATENT DOCUMENTS

| | | | | |
|---|---|---|---|---|
| 4,614,729 A | * | 9/1986 | Crawford et al. | 502/401 |
| 6,300,441 B1 | * | 10/2001 | Schade et al. | 526/177 |
| 6,303,721 B1 | * | 10/2001 | Latsch et al. | 526/176 |
| 6,444,762 B1 | * | 9/2002 | Fischer et al. | 526/64 |

* cited by examiner

*Primary Examiner*—Fred Teskin
(74) *Attorney, Agent, or Firm*—Timothy S. Stevens

(57) ABSTRACT

This invention is a process to manufacture high quality vinyl aromatic polymer that is essentially free of unreacted vinyl aromatic monomer using retarded anionic polymerization wherein the retardant is insoluble and can be removed from the polymerization at an intermediate stage so that the polymerization can be carried to completion in the absence of the retardant.

19 Claims, 2 Drawing Sheets

RETARDED ANIONIC POLYMERIZATION OF VINYL AROMATIC MONOMERS USING INSOLUBLE OR HETEROGENEOUS RETARDANTS

PRIORITY

This application claims priority from U.S. Provisional Application No. 60/666,365 filed Mar. 30, 2005.

BACKGROUND OF THE INVENTION

Anionic polymerization of vinylaromatic monomers offers significant advantages over free radical polymerization because the polymer is more pure and better quality. However, the rate of polymerization is so rapid that high levels of solvent or special process technology is required in order to control the process. One of the most recent advances is to add a polymerization rate retardant to the process; see for example U.S. Pat. No. 6,350,834.

Relevant prior art includes:
U.S. Patents
U.S. Pat. No. 5,902,865—Preparation of polystyrene by continuous anionic polymerization
U.S. Pat. No. 6,444,762—Anionic polymerization process
U.S. Pat. No. 6,350,834—Method for retarded anionic polymerization
U.S. Pat. No. 6,429,273—Process for the preparation of vinylic polymers, polymerization initiator for vinylic monomers, and styrene resin composition
Publications
Initiation of Styrene Retarded Anionic Polymerization Using the Combination of Lithium Alkoxides with Organometallic Compounds, Menoret, Stephane; Fontanille, Michel; Deffieux, Alain; Desbois, Philippe; Demeter, Juergen. Laboratoire de Chimie des Polymeres Organiques, Macromolecules (2002), 35(12), 4584
Retarded anionic polymerization; 5. influence of the structure of dialkylmagnesium additives on the reactivity of polystyryllithium species, Menoret, Stephane; Carlotti, Stephane; Fontanille, Michel; Deffieux, Alain; Desbois, Philippe; Schade, Christian; Schrepp, Wolfgang; Warzelhan, Volker, Macromolecular Chemistry and Physics (2001), 202(16), 3219
Towards the control of the reactivity in high temperature anionic polymerization of styrene: retarded anionic polymerization; 3. influence of triisobutylaluminum on the reactivity of polystyryllithium species, Desbois, Philippe; Fontanille, Michel; Deffieux, Alain; Warzelhan, Volker; Schade, Christian, Macromolecular Symposia (2000), 157(International Symposium on Ionic Polymerization, 1999), 151

However, in the prior art the retardant additive can not be removed from the polymer resulting in high cost and poor quality polymer. It would be an advance in the art if a process were invented whereby the retardant additive could be removed from the polymer and then recycled.

SUMMARY OF THE INVENTION

This invention is a process to manufacture, for example, polystyrene without the need for any solvent.

This invention supplies the polymerization rate retardant in insoluble or heterogeneous form so that it can be easily removed. Following removal of the retardant, the polymerization rate accelerates resulting in essentially complete conversion of monomer.

This invention is a process for making vinyl aromatic polymer without the need for devolatilization because the monomer is almost totally removed by polymerization.

This invention also provides an improved process for production of polystyrene when a solvent and devolatilization are utilized.

The invention reduces the cost of manufacture of vinyl aromatic polymer using retarded anionic polymerization because the retardant is recovered and preferably reused.

Advantages:

This invention provides a way to manufacture vinyl aromatic polymer granules that are essentially free of unreacted vinyl aromatic monomer. Prior art processes utilize soluble retardant additives to regulate the polymerization rate but the retardant additives remain in the product resulting in diminished quality and increased cost because they are not recycled. This invention eliminates the need for removal of unreacted monomer and reduces the usage of retardant material.

In the case that use of a solvent and subsequent devolatilization are desired, our invention offers the above improvements in quality and cost.

BRIEF DESCRIPTION OF THE DRAWINGS

FIG. 1 shows the retarded polymerization being conducted followed by removal of the retardant allowing the polymerization to proceed in a second reactor in the absence of the retardant. FIG. 2 shows the retarded polymerization being carried out in two stages followed by removal of the heterogeneous retardant and devolatilization to remove unreacted monomer and solvent. Both the heterogeneous retardant and the unreacted monomer/solvent can be collected and reused.

DETAILED DESCRIPTION

Figure 1:
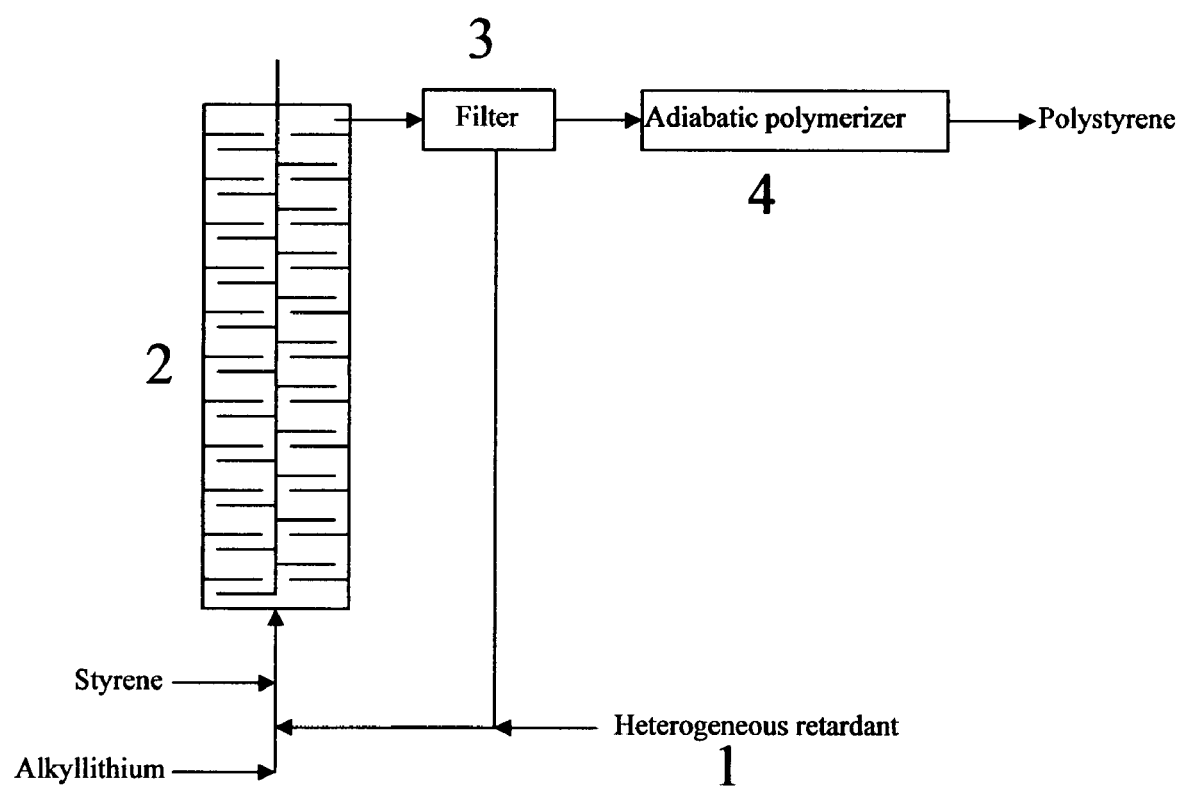
FIGS. 1 and 2 are schematic drawings showing options for carrying out this invention.

Vinylaromatic polymers are manufactured using free radical polymerization in the bulk because the polymerization rate is slow allowing time for removal of the heat of polymerization. Bulk anionic polymerization is currently not used commercially to manufacture vinyl aromatic polymer because the polymerization rate is too fast for heat removal resulting in explosive runaway polymerization. Researchers recently discovered that the polymerization rate can be retarded by the addition of certain soluble organometallic compounds containing bivalent (or greater) metals to slow down the rate of polymerization so as to be able to remove the heat and control the polymerization process. However, there are two pirmary problems with the process that must be overcome before it can be used to manufacture vinylaromatic polymers that are useful for commerce: 1) the vinylaromatic polymers produced using the prior art retarded anionic polymerization processes have poor clarity because the organometallic retardant additives remain in the polymer and 2) the organometallic retardants are very costly and are not recovered and recycled during the process. This invention provides a significant improvement over the art by providing a way to use the soluble retardant material by binding it to an easily removable insoluble material so that it can be recovered and reused. After removal of the bound or heterogeneous retardant, the polymerization can proceed at its normal rapid speed so that the remaining monomer is quickly and completely converted to polymer. The heat generated by the remaining polymerization can be utilized to carry the polymer temperature high enough (>200 deg. C) to allow the molten polymer to be pumped through a die so that it can be cut into granules.

The reactor used for the portion of the polymerization that is carried out in the presence of the heterogeneous retardant additive can be of any type as long as it has a means for mixing and a means for heat removal. The preferred reactor type is an agitated tower reactor or series of agitated tower reactors having good radial mixing and little intermixing of the regions of the reactor having different degrees of monomer conversion. The temperature range for polymerization carried out in the presence of the heterogeneous retardant is preferably between 20-160 degC., more preferably between 40 and 140 degC., and most preferably between 60 and 120 degC. Below 20 degC. the polymerization rate is extremely slow and above 160 degC., the rate of chain termination is high due to thermal decomposition of the growing polymer chain.

The reactor used for the portion of the polymerization that is carried out after the heterogeneous retardant has been removed should be capable of moving highly viscous materials. Examples of this type of reactor are extruders. This reactor does not need any heat removal capability and in fact, it is best if it has no or little heat removal as the heat generated by the polymerization helps to carry the polymer temperature up to over 200 deg. C. which is beneficial in order to lower the polymer viscosity to a range that it can be more readily handled.

The heterogeneous retardant additives of this invention are prepared by binding soluble organometallic materials that contain bivalent (or greater) metals to an insoluble particulate material. Examples of these reagents include dibutylmagnesium and triethylaluminum. These reagents can be supported on, for example, vinyl aromatic monomer insoluble organic particles and vinyl aromatic monomer insoluble inorganic particles. Examples of organic particles include crosslinked vinyl aromatic polymer beads having functional groups on the beads capable of complexing with organometallic compounds containing bivalent (or greater) metals. Examples of inorganic particles include, for example, anhydrous silica gel and molecular sieves.

Figure 2:
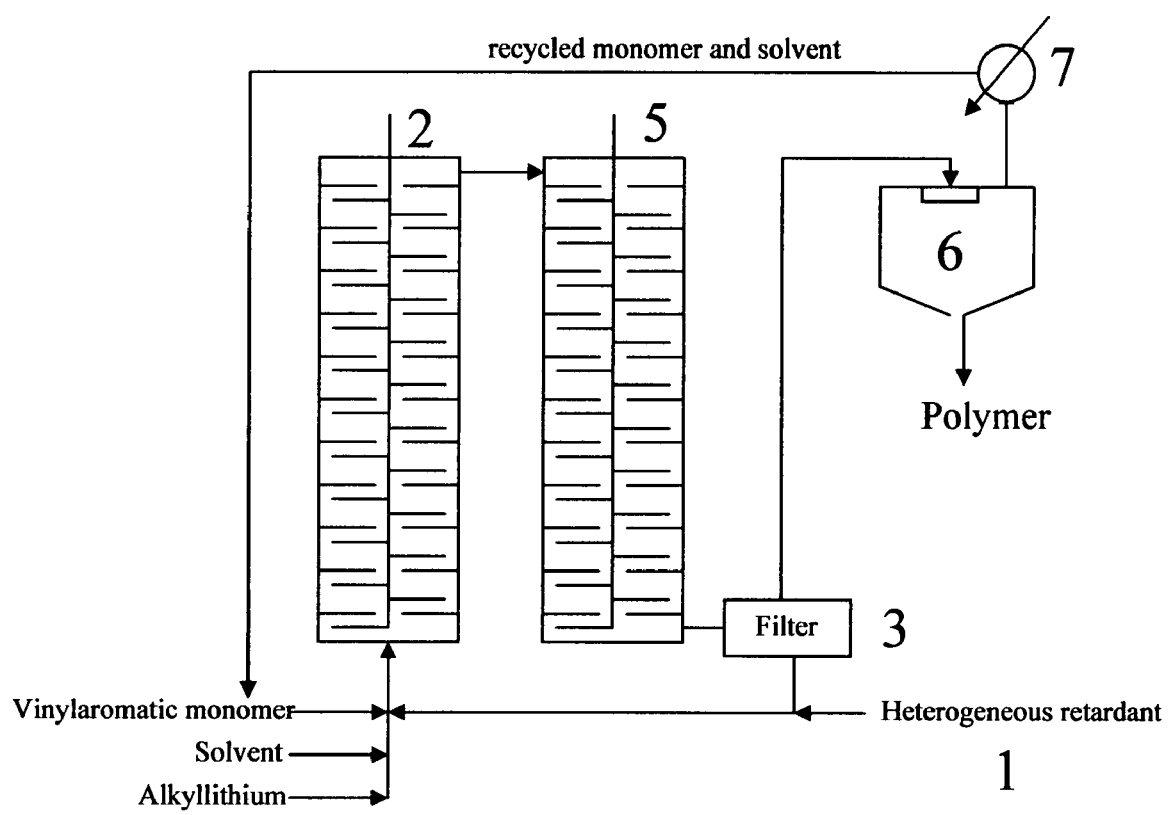

Referring now to FIGS. 1 and 2, the following reference numerals are used:

1—heterogeneous retardant
  2—retarded anionic polymerization reactor
  3—device for removal of heterogeneous retardant
  4—adiabatic reactor for finishing the polymerization
  5—second stage polymerizer
  6—devolatilizer The heterogeneous retardant 1 is added to the anionic polymerization reactor 2 along with vinyl aromatic monomer where between, for example, 40 and 80% of the monomer is converted to polymer. The retardant 1 is removed by device 3 and the partial polymer syrup is forwarded to adiabatic polymerizer 4 where the rate of polymerization rapidly carries the monomer conversion to >99.9% and the temperature to over 200 degrees centigrade.

The heterogeneous retardant 1 is prepared by treating a particulate material (e.g., silica gel), that is insoluble in vinyl aromatic monomer, with a solution containing an organometallic compound containing an organometallic compound containing a bivalent (or greater) metal (e.g., dibutylmagnesium or triisobutylaluminum). The heterogeneous retardant is slurried in vinyl aromatic monomer inside the polymerizer 2. An organolithium initiator (e.g., n-butyllithium) is added to the polymerizer containing the slurry and the slurry heated until the desired monomer conversion is achieved. The heterogeneous retardant 1 is removed from the polymerizer syrup by, for example, filtration. Once the heterogeneous retardant is removed, the rate of polymerization increases rapidly carrying the temperature of the syrup up to over 200 degrees centigrade. The resulting polymer melt is essentially free of unreacted vinyl aromatic monomer and can be extruded into strands and cut into granules.

ILLUSTRATIVE EXAMPLES

Example 1

Preparation of Heterogeneous Retardant

Dowex MSA1 macroporous anion exchange beads (500 g) are placed in a 2 L round-bottom flask equipped with a Dean Stark trap, heating mantle, bottom drain valve, septum, and mechanical stirrer. Toluene (500 mL) is added. Heat is applied with stirring and water is removed. When no more water can be removed, the Dean Stark trap is replaced by a dry nitrogen inlet. The contents of the flasks are placed under a dry nitrogen atmosphere. Triisobutylaluminum (10 ml of a 15% by weight solution) is injected into the slurry of beads. After stirring for 30 minutes, the liquid is drained from the bottom of the flask. Fresh dry toluene (500 mL) is added and stirring continued for 10 minutes. The liquid is drained from the flask. This washing is continued until the toluene drained from the flask contains <1 ppm of triisobutylaluminum.

Example 2

Retarded Anionic Polymerization of 4-methylstyrene

The heterogeneous retardant prepared in Example 1 (300 g) is transferred under a nitrogen atmosphere into a 1 gallon agitated reactor. The reactor is filled with a solution consisting of 20% toluene and 80% 4-methylstyrene. The mixture is heated and stirred at 100 deg.C. for 2 h to achieve a viscous syrup containing 55% solids. The syrup is pumped from the reactor and into a 1-inch extruder heated at 180 deg.C. A filter element is located in the transfer line to retain the heterogeneous retardant. A vacuum of 5 mmHg is pulled on the extruder to remove volatile components. The molten polymer is extruded through a die and the strand is cut into granules.

Example 3

Preparation of Polystyrene

A 500 mL round bottom flask is equipped with a mechanical agitator, nitrogen inlet and outlet, rubber septum, dropping funnel, and a glass frit filter at the drain outlet on the bottom of the flask. Anhydrous silica gel particles (10 g) having an average particle size of 0.5 mm is placed in the flask. Dry hexane (100 mL) is added to the flask. Stirring is started to create a slurry. A 15% by weight solution of dibutylmagnesium in hexane (1 mL) is injected into the flask using a syringe. After stirring at ambient temperature for 30 min., agitation is stopped and the liquid drained from the flask through the drain valve. Fresh hexane (200 mL) is added to the flask and agitation begun for 15 min. followed by draining. This hexane washing of the dibutylmagnesium/ silica gel heterogeneous retardant is repeated twice more to insure that all of the soluble material is removed. Anhydrous styrene (200 mL) is then added to the flask and agitation begun. A 15% by weight solution of n-butyl lithium in hexane (0.1 mL) is injected by syringe into the slurry. The polymerization mixture is heated to 80 deg. C and stirring continued until the conversion of monomer to polymer reached 40%. Stirring is stopped and nitrogen pressure is applied to the flask to force the syrup through the filter at the bottom and into an insulated steel pipe which is 2 inches in diameter and 10 inches long. After transferring the syrup into the pipe, it is sealed. After 30 min. the pipe is packed in dry ice for 10 minutes. The pipe is opened and the solid polystyrene removed. Analysis of the polystyrene showed that it contains <200 ppm of unreacted styrene monomer.

Another 200 mL of anhydrous styrene is added to the contents of the drained flask containing the same heterogeneous retardant used previously and stirring begun. A 15% by weight solution of n-butyl lithium in hexane (0.1 mL) is injected by syringe into the slurry. The polymerization mixture is heated to 80 deg. C. and stirring continued until the conversion of monomer to polymer reached 40%. Stirring is stopped and nitrogen pressure is applied to the flask to force the syrup through the filter at the bottom and into an insulated steel pipe which is 2 inches in diameter and 10 inches long. After transferring the syrup into the pipe, it is sealed. After 30 min. the pipe is packed in dry ice for 10 minutes. The pipe is opened and the solid polystyrene removed. Analysis of the polystyrene showed that it contains <200 ppm of unreacted styrene monomer.

The same procedure is repeated a third time with the same results.

CONCLUSION

While the instant invention has been described above according to its preferred embodiments, it can be modified within the spirit and scope of this disclosure. This application is therefore intended to cover any variations, uses, or adaptations of the instant invention using the general principles disclosed herein. Further, the instant application is intended to cover such departures from the present disclosure as come within the known or customary practice in the art to which this invention pertains and which fall within the limits of the following claims.

What is claimed is:

1. An improved anionic polymerization process of the type using an anionic polymerization initiator to initiate the polymerization of a monomer to a polymer, wherein the improvement comprises using a heterogeneous polymerization retardant.

2. An anionic polymerization process to manufacture vinyl aromatic polymers by polymerizing a vinyl aromatic monomer, the process having at least two polymerization zones wherein at least the first zone contains a heterogeneous polymerization retardant along with an organolithium polymerization initiator that is soluble in the vinyl aromatic monomer.

3. The process of claim 2 wherein the first polymerization zone is an agitated tower operating essentially as a plug-flow reactor having lateral mixing but essentially no intermixing of the regions of the reactor having different degrees of monomer conversion.

4. The process of claim 2 wherein the first polymerization zone is an agitated reactor wherein heat is removed primarily by ebullient cooling.

5. The process of claim 2 wherein the heterogeneous polymerization retardant is removed after 40-70% conversion of monomer to polymer has been achieved.

6. The process of claim 5 wherein after the heterogeneous polymerization retardant is removed, conversion of monomer to polymer is increased to >99.9% thereby allowing most of the heat generated by the polymerization to increase the polymer temperature to >200 deg. C.

7. The process of claim 5 wherein the heterogeneous polymerization retardant is an organoinetallic material containing a bivalent or greater metal that has been bound to organic polymer particles.

8. The process of claim 5 wherein the heterogeneous polymerization retardant is an organometallic material containing a bivalent or greater metal that has been bound to inorganic particles.

9. The process of claim 5 wherein the heterogeneous polymerization retardant is removed by filtration and then recycled into the first polymerization zone.

10. The process of claim 2 wherein the organo-lithium initiator organo-lithium polymerization initiator that is soluble in the vinyl aromatic monomer is n-bulyl lithium.

11. The process of claim 8 wherein the inorganic particles are particles of silica gel.

12. The process of claim 2 where the vinylaromatic monomer is styrene.

13. The process of claim 2 where the vinylaromatic monomer is 4-methylstyrene.

14. The process of claim 2 where the vinylaroinatic monomer is 4-t-butylstyrene.

15. The process of claim 2 where the vinylaromatic monomer is a mixture of styrene and alphamethylstyrene.

16. The process of claim 2 where no solvent is added.

17. The process of claim 2 where toluene is added as solvent.

18. The process of claim 2 where ethylbenzene is added as solvent.

19. The process of claim 1 wherein the heterogeneous polymerization retardant is removed after 40-70% conversion of the monomer to the polymer has been achieved.

* * * * *